United States Patent
Chen et al.

(10) Patent No.: US 11,258,995 B2
(45) Date of Patent: Feb. 22, 2022

(54) LIGHT EMITTING DIODE PROJECTOR AND DRIVE CIRCUIT THEREOF

(71) Applicant: Qisda Corporation, Taoyuan (TW)

(72) Inventors: Chi-Jen Chen, Taoyuan (TW); Fang-Chieh Lu, New Taipei (TW); Chun-Hsiao Lin, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/664,961

(22) Filed: Oct. 28, 2019

(65) Prior Publication Data

US 2020/0233295 A1 Jul. 23, 2020

(30) Foreign Application Priority Data

Jan. 23, 2019 (CN) .......................... 201910060970.3

(51) Int. Cl.
*H04N 9/31* (2006.01)
*G03B 21/20* (2006.01)

(52) U.S. Cl.
CPC ....... *H04N 9/3155* (2013.01); *G03B 21/2013* (2013.01); *G03B 21/2033* (2013.01); *G03B 21/2053* (2013.01); *H04N 9/3164* (2013.01)

(58) Field of Classification Search
CPC ............ G03B 21/2013; G03B 21/2033; G03B 21/204; G03B 21/2053; G03B 33/08; H04N 9/312; H04N 9/3123; H04N 9/3126; H04N 9/3135; H04N 9/3138; H04N 9/3155; H04N 9/3158; H04N 9/3161; H04N 9/3164
See application file for complete search history.

(56) References Cited

U.S. PATENT DOCUMENTS

| | | | | |
|---|---|---|---|---|
| 6,224,216 B1 * | 5/2001 | Parker | ............... | G02B 6/4298 |
| | | | | 353/31 |
| 7,088,321 B1 * | 8/2006 | Parker | ............... | G09G 3/3406 |
| | | | | 345/211 |
| 9,497,822 B2 * | 11/2016 | Miyoshi | ............... | H05B 45/48 |
| 9,507,246 B2 * | 11/2016 | Gyoten | ............... | H05B 45/48 |
| 9,603,210 B1 * | 3/2017 | Carlen | ............... | H05B 45/37 |
| 9,852,680 B2 * | 12/2017 | Kato | ............... | G03B 21/16 |
| 10,036,945 B2 * | 7/2018 | Yamada | ............... | H04N 9/3182 |
| 10,101,646 B2 * | 10/2018 | Yamada | ............... | G03B 21/2033 |
| 10,168,607 B2 * | 1/2019 | Iida | ............... | G03B 21/2053 |
| 10,334,694 B2 * | 6/2019 | Tsukahara | ............... | G03B 21/2033 |
| 10,509,305 B2 * | 12/2019 | Iida | ............... | H04N 9/3164 |
| 2009/0219488 A1 * | 9/2009 | Dufour | ............... | G09G 3/002 |
| | | | | 353/20 |
| 2011/0062889 A1 * | 3/2011 | Hoogzaad | ............... | G09G 3/342 |
| | | | | 315/294 |

(Continued)

*Primary Examiner* — Bao-Luan Q Le

(57) ABSTRACT

A projector and a drive circuit thereof are provided. The projector includes a light source and a drive circuit. The light source includes at least one red light diode, at least one green light diode, at least one first blue light diode and at least one second blue light diode. The drive circuit includes a red light drive circuit, a green light drive circuit, a first blue light drive circuit and a second blue light drive circuit. The green light drive circuit outputs a green light drive signal to the green light diode according to a green light control signal. The second blue light drive circuit outputs a second blue light drive signal to the second blue light diode according to a second blue light control signal. The second blue light control signal and the green light drive signal have synchronous pulse.

14 Claims, 5 Drawing Sheets

(56) References Cited

U.S. PATENT DOCUMENTS

| | | | |
|---|---|---|---|
| 2013/0257305 A1* | 10/2013 | Lee | H05B 45/37 |
| | | | 315/210 |
| 2013/0271673 A1* | 10/2013 | Katou | G03B 33/12 |
| | | | 348/744 |
| 2014/0300655 A1* | 10/2014 | Kato | G03B 21/16 |
| | | | 345/691 |
| 2014/0313422 A1* | 10/2014 | Kanno | H04N 9/3155 |
| | | | 348/744 |
| 2014/0368798 A1* | 12/2014 | Gyoten | G03B 21/204 |
| | | | 353/85 |
| 2016/0143100 A1* | 5/2016 | Miyoshi | G03B 21/2033 |
| | | | 315/120 |
| 2016/0366377 A1* | 12/2016 | Lim | G02B 26/0833 |
| 2018/0113380 A1* | 4/2018 | Iida | H04N 9/3194 |
| 2018/0180978 A1* | 6/2018 | Yamada | H04N 9/3182 |
| 2018/0267395 A1* | 9/2018 | Yamada | H05B 45/37 |
| 2018/0307131 A1* | 10/2018 | Yamada | H04N 9/3182 |
| 2019/0086781 A1* | 3/2019 | Iida | G03B 21/2013 |
| 2019/0110349 A1* | 4/2019 | Tsukahara | G03B 21/2033 |
| 2019/0230764 A1* | 7/2019 | Yamada | G03B 21/2013 |

* cited by examiner

LIGHT EMITTING DIODE PROJECTOR AND DRIVE CIRCUIT THEREOF

This application claims the benefit of People's Republic of China application Serial No. 201910060970.3, filed Jan. 23, 2019, the subject matter of which is incorporated herein by reference.

BACKGROUND OF THE INVENTION

Field of the Invention

The invention relates in general to a projector and a drive circuit thereof, and more particularly to a light emitting diode (LED) projector and a drive circuit thereof.

Description of the Related Art

Along with the development of projection technology, various projectors have been provided one after another. In recent years, projector technology has experienced a significant breakthrough, that is, the technology of LED light source is used in the projector. The projector using LED light source technology is referred as LED projector. The LED light source has the advantages of light weight, low temperature, high brightness, high light collimation, and high reliability. In terms of projector technology, this is really a significant breakthrough.

However, the LED light source used in projector still has several technical bottlenecks. For example, to achieve better efficiency, the brightness and color saturation of the LED light source using in the projector still need to be improved.

SUMMARY OF THE INVENTION

The invention is directed to a projector and a drive circuit thereof capable of increasing the brightness of the projector by 40% by an additional blue light diode synchronizing with a green light diode without affecting the color saturation.

According to an embodiment of the present invention, a projector is provided. The projector includes a light source and a drive circuit. The light source includes at least one red light diode, at least one green light diode, at least one first blue light diode and at least one second blue light diode. The drive circuit includes a red light drive circuit, a green light drive circuit, a first blue light drive circuit and a second blue light drive circuit. The red light drive circuit is configured to output a red light drive signal to the red light diode according to a red light control signal. The green light drive circuit is configured to output a green light drive signal to the green light diode according to a green light control signal. The first blue light drive circuit is configured to output a first blue light drive signal to the first blue light diode according to a first blue light control signal. The second blue light drive circuit is configured to output a second blue light drive signal to the second blue light diode according to a second blue light control signal. The second blue light control signal and the green light drive signal have synchronous pulse.

According to another embodiment of the present invention, a drive circuit is provided. The drive circuit includes a red light drive circuit, a green light drive circuit, a first blue light drive circuit and a second blue light drive circuit. The red light drive circuit is configured to output a red light drive signal to a red light diode according to a red light control signal. The green light drive circuit is configured to output a green light drive signal to a green light diode according to a green light control signal. The first blue light drive circuit is configured to output a first blue light drive signal to a first blue light diode according to a first blue light control signal. The second blue light drive circuit is configured to output a second blue light drive signal to a second blue light diode according to a second blue light control signal. The second blue light control signal and the green light drive signal have synchronous pulse.

The above and other aspects of the invention will become better understood with regard to the following detailed description of the preferred but non-limiting embodiment(s). The following description is made with reference to the accompanying drawings.

DETAILED DESCRIPTION OF THE INVENTION

Details of increasing the brightness of the projector of the present disclosure by 40% by an additional blue light diode synchronizing with a green light diode without affecting the color saturation are disclosed below.

Figure 1:
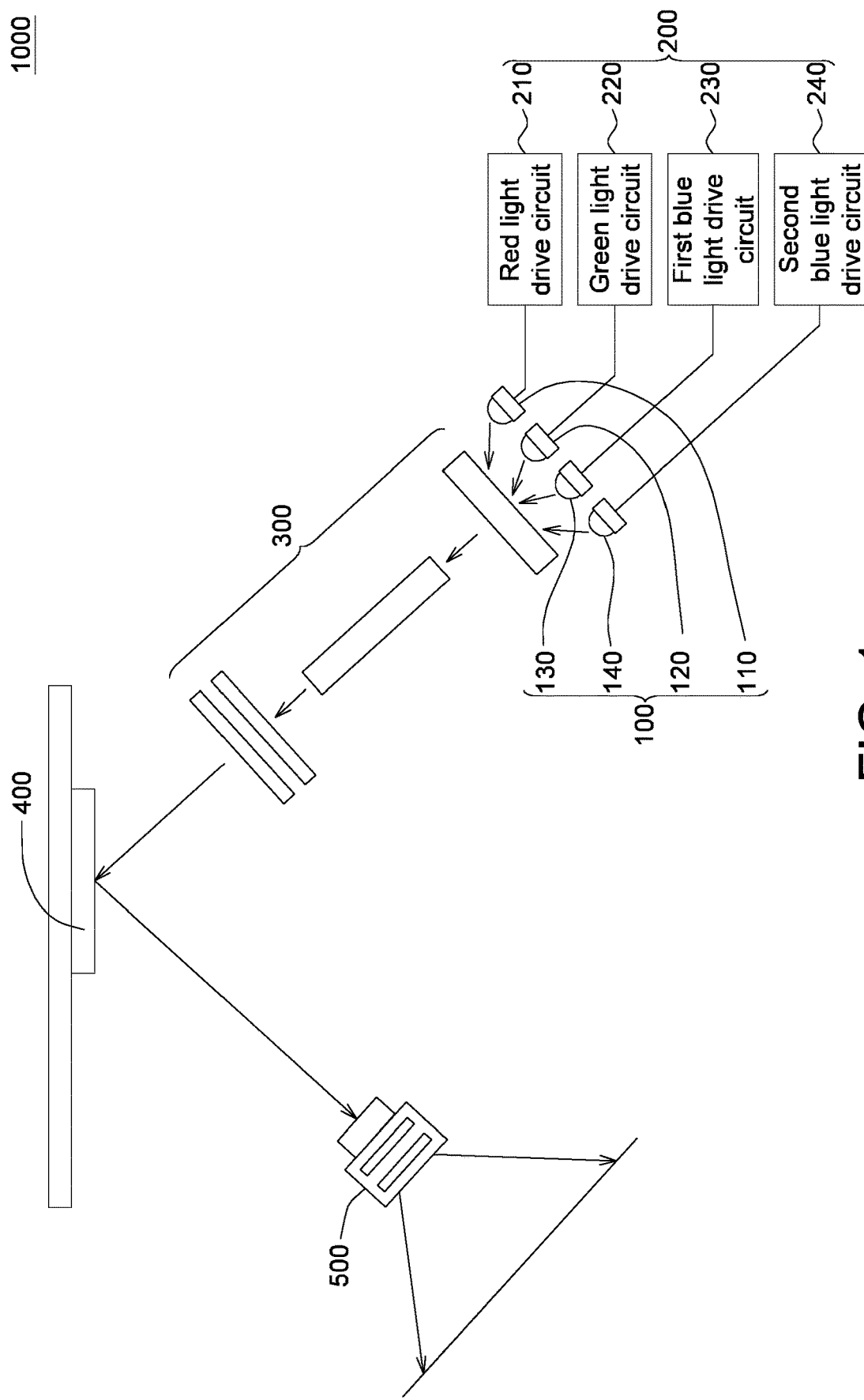
FIG. 1 is a schematic diagram of a projector according to an embodiment.

Referring to FIG. 1, a schematic diagram of a projector 1000 according to an embodiment is shown. The projector 1000 includes a light source 100, a drive circuit 200, a ray machine 300, a digital micromirror device (DMD) 400 and a projection lens 500. The projector 1000 of FIG. 1 is exemplified by a DLP™ projector. In another embodiment, the projector 100 can be exemplified by a LCD projector.

The light source 100 includes at least one red light diode 110, at least one green light diode 120, at least one first blue light diode 130 and at least one second blue light diode 140. In the present embodiment, the quantity of the at least one blue light diode, such as first blue light diode 130 and second blue light diode 140, is two times of the quantity of the at least one red light diode 110. The quantity of the at least one blue light diode, such as first blue light diode 130 and second blue light diode 140, is two times of the quantity of the green light diode 120.

The drive circuit 200 includes a red light drive circuit 210, a green light drive circuit 220, a first blue light drive circuit 230 and a second blue light drive circuit 240. The red light drive circuit 210, the green light drive circuit 220, the first blue light drive circuit 230 and the second blue light drive circuit 240 are configured to drive and control the red light diode 110, the green light diode 120, the first blue light diode 130 and the second blue light diode 140 respectively. The red light diode 110, the green light diode 120, the first blue light diode 130 and the second blue light diode 140 can be packaged on the same substrate, which is then electrically connected to the drive circuit 200. Or, the red light diode 110 can be disposed on the same circuit board with the red light drive circuit 210; the green light diode 120 can be disposed on the same circuit board with the green light drive circuit 220; the first blue light diode 130 can be disposed on the same circuit board with the first blue light drive circuit 230;

the second blue light diode 140 can be disposed on the same circuit board with the second blue light drive circuit 240. The disposition of the red light diode 110, the green light diode 120, the first blue light diode 130, the second blue light diode 140, the red light drive circuit 210, the green light drive circuit 220, the first blue light drive circuit 230 and the second blue light drive circuit 240 is not limited in the present disclosure.

Figure 2:
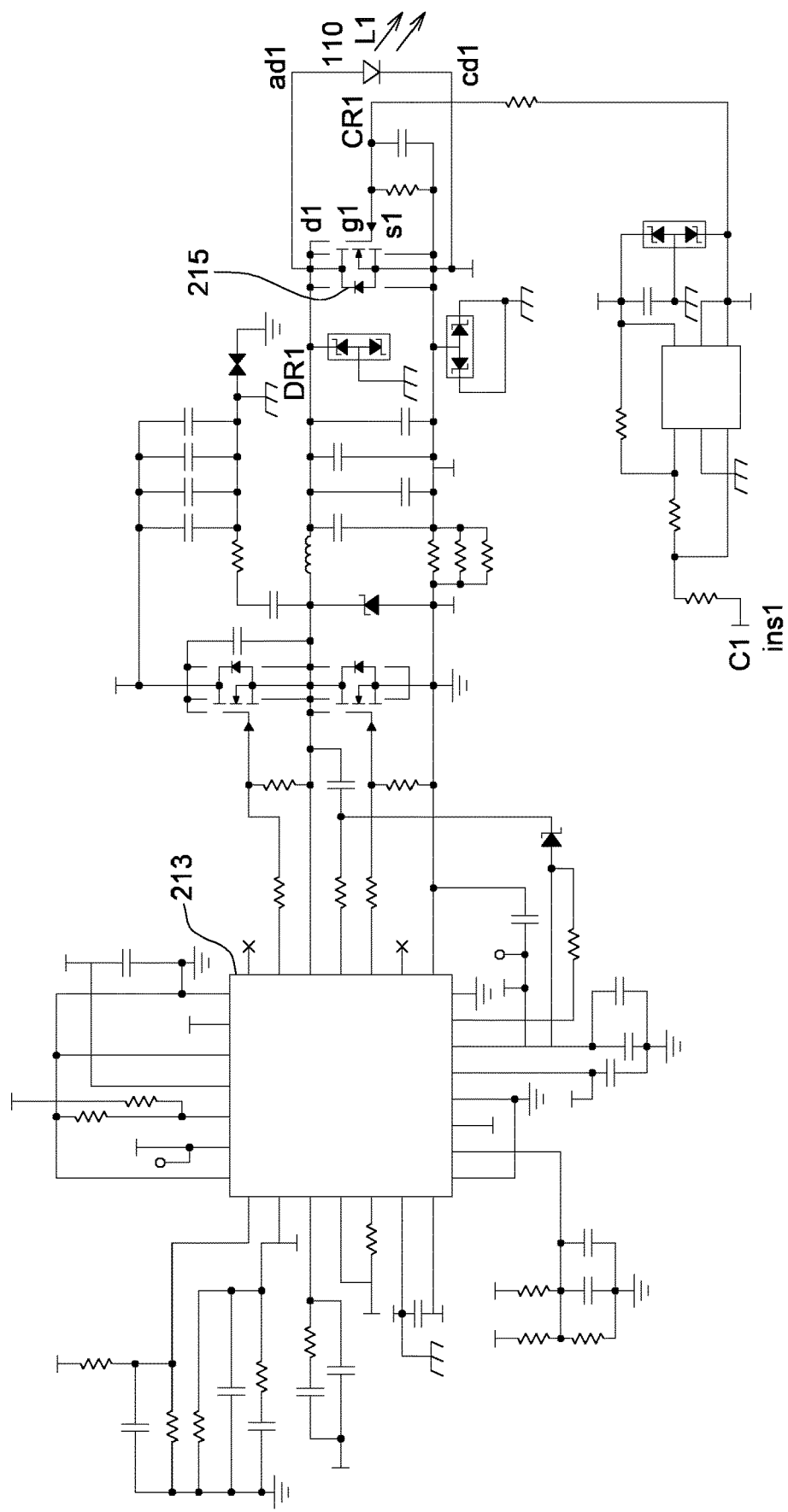
FIG. 2 is a schematic diagram of a red light drive circuit and a red light diode.

Referring to FIG. 2, a schematic diagram of a red light drive circuit 210 and a red light diode 110 is shown. The red light drive circuit 210 includes a main drive chip 213 and a control transistor 215. The main drive chip 213 is coupled to an anode ad1 and a cathode cd1 of the red light diode 110 and outputs a red light drive signal DR1 to the anode ad1 of the red light diode 110. When the red light drive signal DR1 is at a high voltage level (higher than the threshold voltage of the red light diode 110), the red light diode 110d is driven to emit a red light L1.

A source s1 and a drain d1 of the control transistor 215 are coupled to the anode ad1 and the cathode cd1 of the red light diode 110. A gate g1 of the control transistor 215 is coupled to the red light control signal CR1. The main circuit board of the projector 1000 inputs a control signal C1 to the control input end ins1 to form the red light control signal CR1. When the red light control signal CR1 is at a high voltage level (higher than the threshold voltage of the control transistor 215), the source s1 and the drain d1 of the control transistor 215 form a path, and the current flows to the path between the source s1 and the drain d1. When the red light control signal CR1 is at a low voltage level (lower than the threshold voltage of the control transistor 215), the source s1 and the drain d1 of the control transistor 215 form a breakage (equivalent to a resistor), and therefore the current flows to the red light diode 110.

That is, the red light drive circuit 210, according to the red light control signal CR1, determines whether to output the red light drive signal DR1 to the anode ad1 of the red light diode 110 to drive the red light diode 110.

Figure 3:
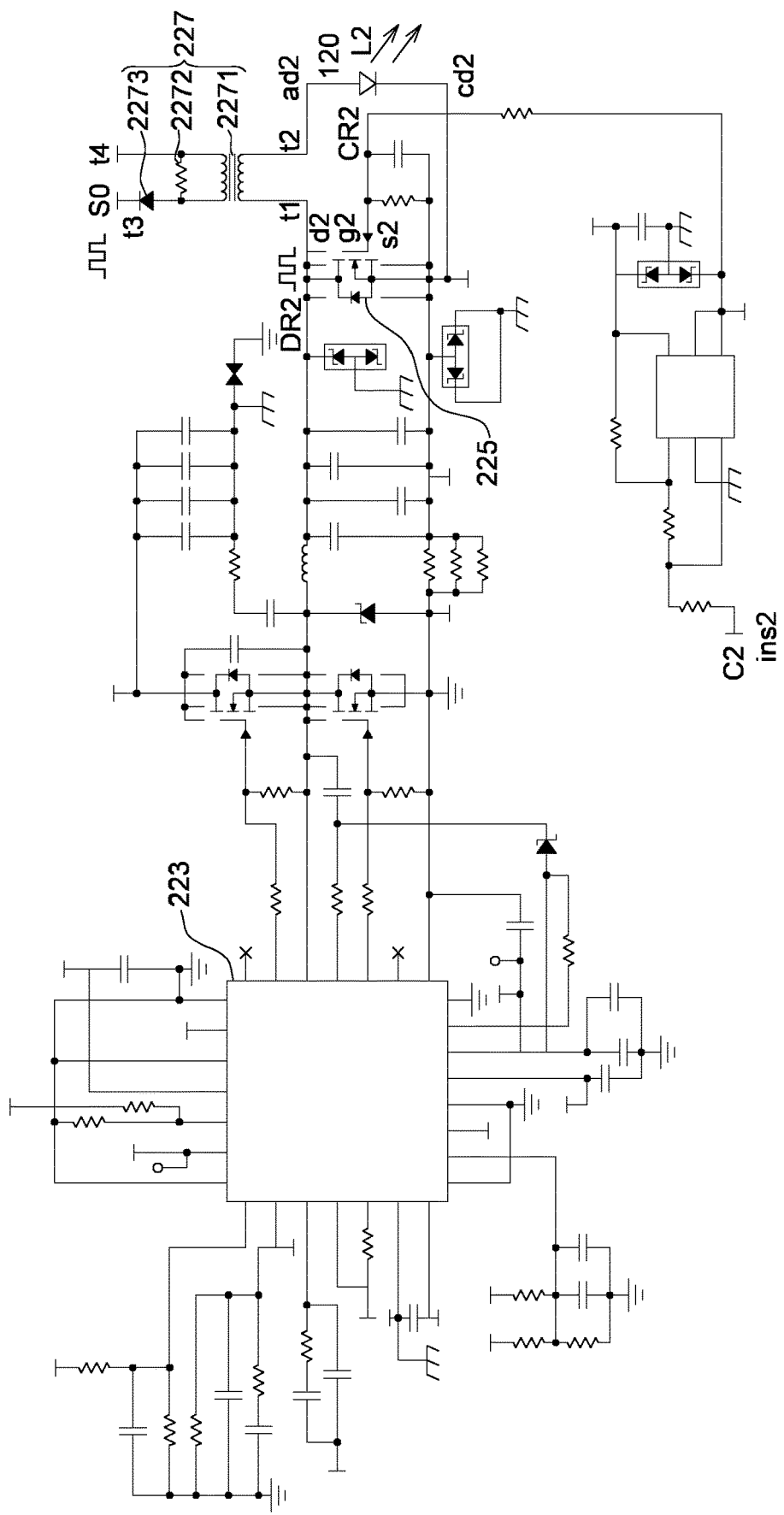
FIG. 3 is a schematic diagram of a green light drive circuit and a green light diode.

Referring to FIG. 3, a schematic diagram of a green light drive circuit 220 and a green light diode 120 is shown. The green light drive circuit 220 includes a main drive chip 223, a control transistor 225 and a synchronous circuit 227. The main drive chip 223 is coupled to an anode ad2 and a cathode cd2 of the green light diode 120 and outputs a green light drive signal DR2 to the anode ad2 of the green light diode 120. When the green light drive signal DR2 is at a high voltage level (higher than the threshold voltage of the green light diode 120), the green light diode 120 is driven to emit a green light L2.

The synchronous circuit 227 is connected in series with the anode ad2 of the green light diode 120 to couple out a synchronous signal S0 having a pulse synchronous with the green light drive signal DR2. In an embodiment, the synchronous signal S0 and the green light drive signal DR2 form positive phase synchronization.

The synchronous circuit 227 has a first end t1, a second end t2, a third end t3 and a fourth end t4. The first end t1 is coupled to the green light drive signal DR2. The second end t2 is coupled to the anode ad2 of the green light diode 120. Thus, the green light drive signal DR2 can be inputted to the anode ad2 of the green light diode 120 through the first end t1 and the second end t2 of the synchronous circuit 227.

To put it in greater details, the synchronous circuit 227 includes a coupling element 2271, a resistor 2272 and a switch diode 2273. The coupling element 2271 can be a coupling transformer formed by such as two or more than two coils. The switch diode 2273 is coupled to the fourth end t4. The two ends of the resistor 2272 are coupled to the switch diode 2273 and the third end t3. The coupling element 2271 is coupled to the first end t1, the second end t2, and the two ends of the resistor 2272.

When the green light drive signal DR2 passes through the coupling element 2271, the coupling element 2271 allows the voltage level of the third end t3 to synchronize with that of the first end t1, such that the synchronous circuit 227 can form a synchronous signal S0 at the third end t3. In an embodiment, the green light drive signal DR2 and the synchronous signal S0 form positive phase synchronization.

A source s2 and a drain d2 of the control transistor 225 are coupled to the anode ad2 and the cathode cd2 of the green light diode 120. A gate g2 of the control transistor 225 is coupled to the green light control signal CR2. The main circuit board of the projector 1000 inputs a control signal C2 to the control input end ins2 to form the green light control signal CR2. When the green light control signal CR2 is at a high voltage level (higher than the threshold voltage of the control transistor 225), the source s2 and the drain d2 of the control transistor 225 form a path, and therefore the current flows to the path between the source s2 and the drain d2. When the green light control signal CR2 is at a low voltage level (lower than the threshold voltage of the control transistor 225), the source s2 and the drain d2 of the control transistor 225 form a breakage (equivalent to a resistor), and therefore the current flows to the green light diode 120.

That is, the green light drive circuit 220, according to the green light control signal CR2, determines whether to output the green light drive signal DR2 to the anode ad2 of the green light diode 120 to drive the green light diode 120.

Figure 4:
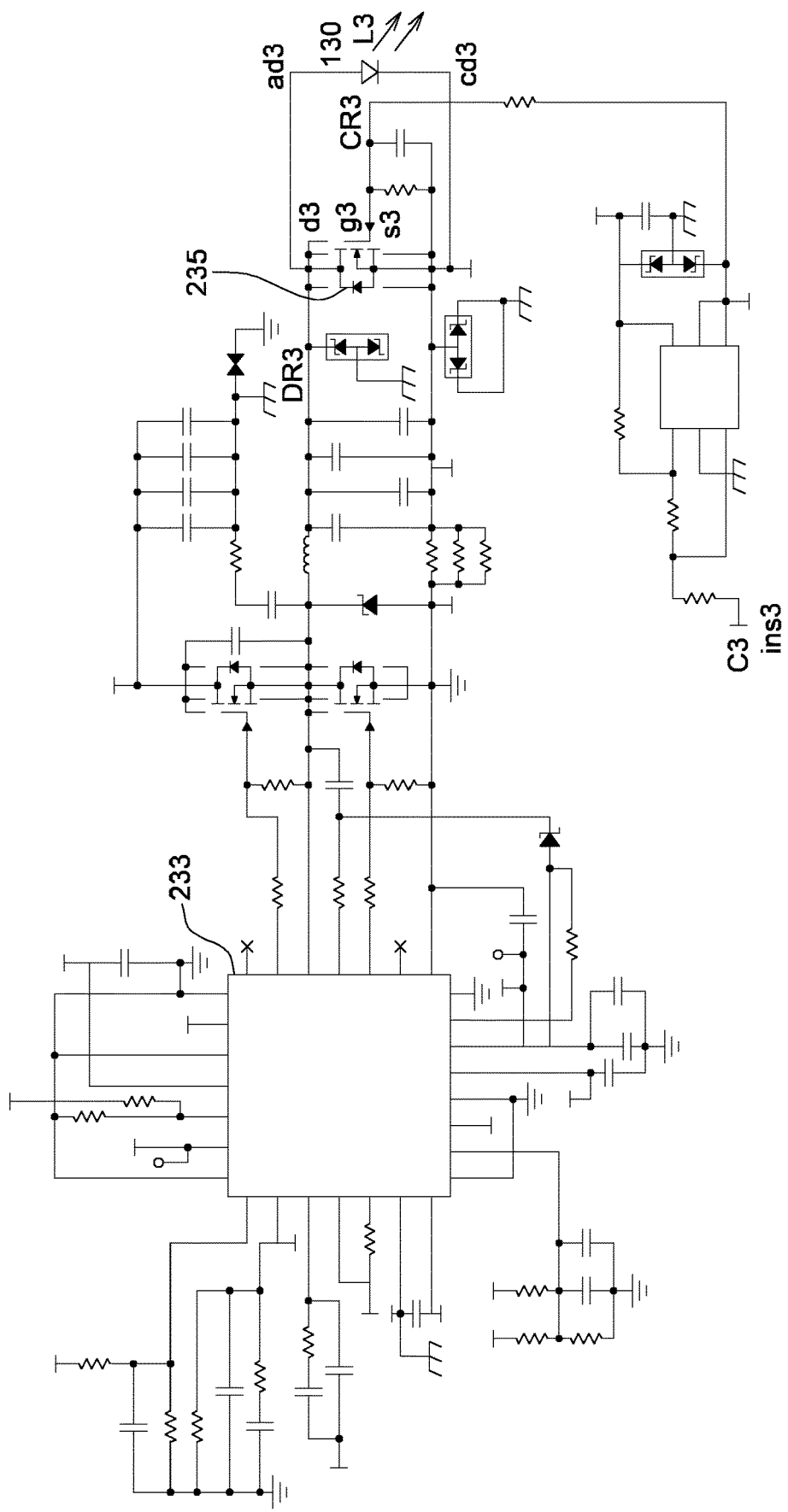
FIG. 4 is a schematic diagram of a first blue light drive circuit and a first blue light diode.

Referring to FIG. 4, a schematic diagram of a first blue light drive circuit 230 and a first blue light diode 130 is shown. The first blue light drive circuit 230 includes a main drive chip 233 and a control transistor 235. The main drive chip 233 is coupled to an anode ad3 and a cathode cd3 of the first blue light diode 130 and outputs a first blue light drive signal DR3 to the anode ad3 of the first blue light diode 130. When the first blue light drive signal DR3 is at a high voltage level (higher than the threshold voltage of the first blue light diode 130), the first blue light diode 130 is driven to emit a first blue light L3.

A source s3 and a drain d3 of the control transistor 235 are coupled to the anode ad3 and the cathode cd3 of the first blue light diode 130. A gate g3 of the control transistor 235 is coupled to the first blue light control signal CR3. The main circuit board of the projector 1000 inputs a control signal C3 to the control input end ins3 to form the blue light control signal CR3. When the first blue light control signal CR3 is at a high voltage level (higher than the threshold voltage of the control transistor 235), the source s3 and the drain d3 of the control transistor 235 form a path, and therefore the current flows to the path between the source s3 and the drain d3. When the first blue light control signal CR3 is at a low voltage level (lower than the threshold voltage of the control transistor 235), the source s3 and the drain d3 of the control transistor 235 form a breakage (equivalent to a resistor), and therefore the current flows to the first blue light diode 130.

That is, the first blue light drive circuit 230, according to the first blue light control signal CR3, determines whether to output the first blue light drive signal DR3 to the anode ad3 of the first blue light diode 130 to drive the first blue light diode 130.

Figure 5:
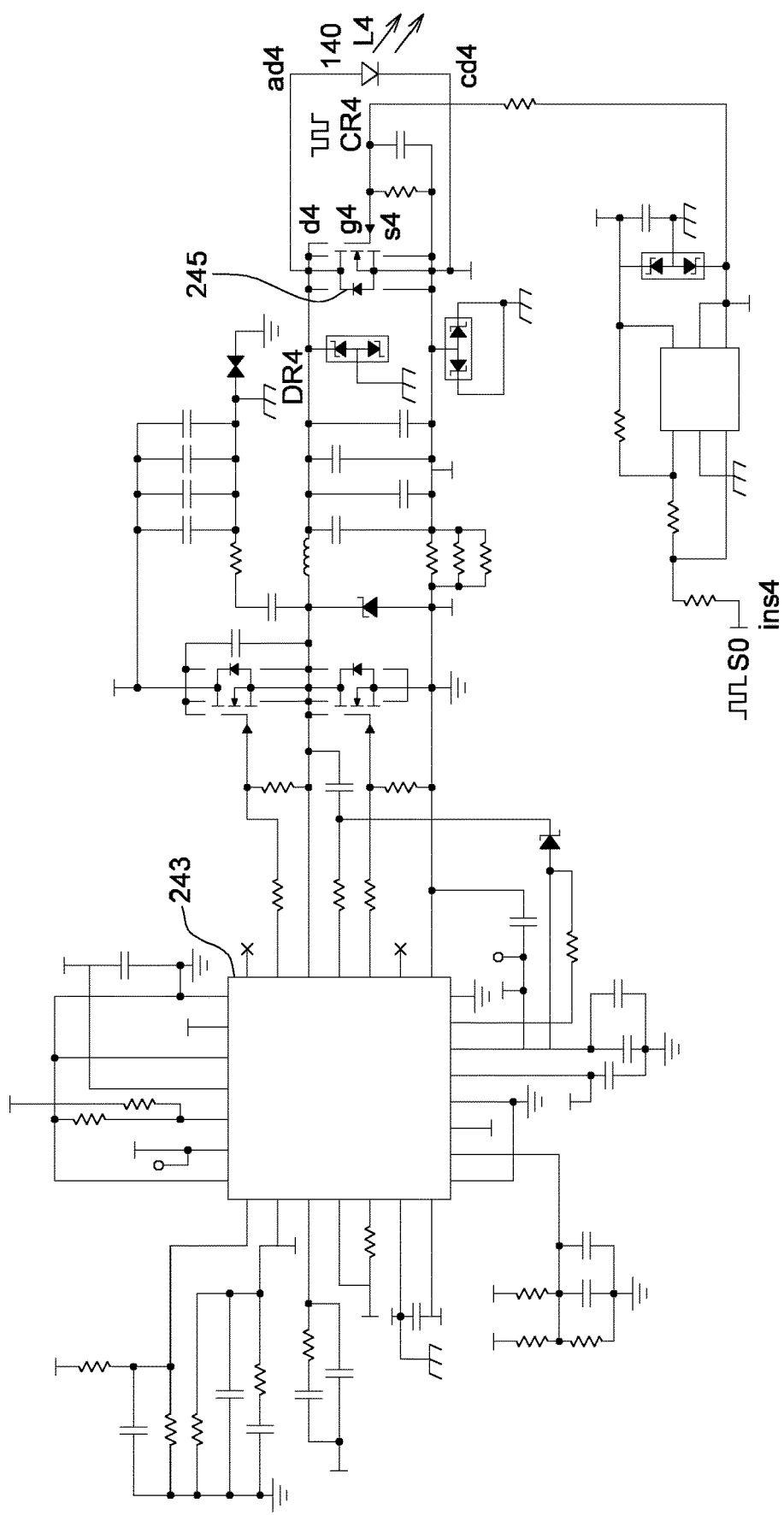
FIG. 5 is a schematic diagram of a second blue light drive circuit and a second blue light diode.

Referring to FIG. 5, a schematic diagram of a second blue light drive circuit 240 and a second blue light diode 140. The second blue light drive circuit 240 includes a main drive chip 243 and a control transistor 245. The main drive chip 243 is coupled to an anode ad4 and a cathode cd4 of the second blue light diode 140 and outputs a second blue light drive signal DR4 to the anode ad4 of the second blue light diode 140. When the second blue light drive signal DR4 is at a high voltage level (higher than the threshold voltage of the second blue light diode 140), the second blue light diode 140 is driven to emit a first blue light L4.

A source s4 and a drain d4 of the control transistor 245 are coupled to the anode ad4 and the cathode cd4 of the second blue light diode 140. A gate g4 of the control transistor 245 is coupled to the second blue light control signal CR4. When the second blue light control signal CR4 is at a high voltage level (higher than the threshold voltage of the control transistor 245), the source s4 and the drain d4 of the control transistor 245 form a path, and therefore the current flows to the path between the source s4 and the drain d4. When the second blue light control signal CR4 is at a low voltage level (lower than the threshold voltage of the control transistor 245), the source s4 and the drain d4 of the control transistor 245 form a breakage (equivalent to a resistor), and therefore the current flows to the second blue light diode 140.

That is, the second blue light drive circuit 240, according to the second blue light control signal CR4, determines whether to output the second blue light drive signal DR4 to the anode ad4 of the second blue light diode 140 to drive the second blue light diode 140.

In the present embodiment, the second blue light control signal CR4 and the green light drive signal DR2 have synchronous pulse. To put it in greater details, as indicated in FIG. 3 and FIG. 5, the synchronous signal S0 outputted from the third end t3 of the synchronous circuit 227 of FIG. 2 is coupled to the control input end ins4 of the second blue light drive circuit 240 of FIG. 5. In the present embodiment, the signal inputted by the control input end ins4 is not the signal outputted from the main circuit board of the projector but the synchronous signal S0 outputted from the third end t3 of the synchronous circuit 227 of FIG. 2. The fourth end t4 of the synchronous circuit 227 of FIG. 2 is coupled to the cathode cd4 of the second blue light diode 140 of FIG. 5. The synchronous signal S0 is inputted to the control input end ins4 of the second blue light drive circuit 240, such that the second blue light control signal CR4 and the synchronous signal S0 have synchronous pulse. In an embodiment the second blue light control signal CR4 and the synchronous signal S0 form negative phase synchronization.

That is, the design of the synchronous circuit 227 of the green light drive circuit 220 allows the green light drive signal DR2, the synchronous signal S0 and the second blue light drive signal CR4 to have synchronous pulse. The second blue light drive signal CR4 and the green light drive signal DR2 form negative phase synchronization. Thus, the additional second blue light diode 140 will be driven only when the green light diode 120 is not driven. The experiment shows that the additional second blue light diode 140 can increase the brightness of the light source 100 without affecting the color rendering of the red light diode 110, the green light diode 120 and the first blue light diode 130. Thus, the projector 1000 can greatly increase brightness by 40% without affecting the original color saturation.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A projector, comprising:
a light source, comprising:
at least one red light diode;
at least one green light diode;
at least one first blue light diode; and
at least one second blue light diode; and
a drive circuit, comprising:
a red light drive circuit configured to output a red light drive signal to the red light diode according to a red light control signal;
a green light drive circuit configured to output a green light drive signal to the green light diode according to a green light control signal;
a first blue light drive circuit configured to output a first blue light drive signal to the first blue light diode according to a first blue light control signal; and
a second blue light drive circuit configured to output a second blue light drive signal to the second blue light diode according to a second blue light control signal, wherein a pulse of the second blue light control signal and a pulse of the green light drive signal are synchronous;
wherein the green light drive circuit comprises a synchronous circuit, the synchronous circuit has a first end, the first end is inputted with the green light drive signal;
a pulse of a synchronous signal and the pulse of the green light drive signal are synchronous, and the synchronous signal is inputted to a control input end of the second blue light drive circuit, such that the pulse of the second blue light control signal and the pulse of the synchronous signal are synchronous.

2. The projector according to claim 1, wherein the synchronous circuit is connected in series with an anode of the green light diode to couple out the synchronous signal.

3. The projector according to claim 2, wherein the synchronous circuit further has a second end, a third end and a fourth end, the second end is coupled to the anode of the green light diode, the third end is coupled to the control input end of the second blue light drive circuit, and the fourth end is coupled to a cathode of the second blue light diode.

4. The projector according to claim 3, wherein the synchronous circuit comprises a coupling element, a resistor and a switch diode, the switch diode is coupled to the fourth end, two ends of the resistor are coupled to the switch diode and the third end, the coupling element is coupled to the first end, the second end, and the two ends of the resistor.

5. The projector according to claim 3, wherein the second blue light drive circuit comprises a control transistor, a source and a drain of the control transistor are coupled to an anode and the cathode of the second blue light diode, and a gate of the control transistor is inputted with the second blue light control signal.

6. The projector according to claim 1, wherein the second blue light control signal is different from the first blue light control signal.

7. A drive circuit, comprising:
a red light drive circuit configured to output a red light drive signal to a red light diode according to a red light control signal;
a green light drive circuit configured to output a green light drive signal to a green light diode according to a green light control signal;
a first blue light drive circuit configured to output a first blue light drive signal to a first blue light diode according to a first blue light control signal; and a second blue light drive circuit configured to output a second blue light drive signal to a second blue light diode according to a second blue light control signal, wherein a pulse of the second blue light control signal and a pulse of the green light drive signal are synchronous;

wherein the green light drive circuit comprises a synchronous circuit, the synchronous circuit has a first end, a second end, a third end and a fourth end, the first end is inputted with the green light drive signal, the second end is coupled to an anode of the green light diode, the third end is coupled to a control input end of the second blue light drive circuit, and the fourth end is coupled to a cathode of the second blue light diode.

8. The drive circuit according to claim 7, wherein the synchronous circuit is connected in series with the anode of the green light diode to couple out a synchronous signal, and a pulse of the synchronous signal and the pulse of the green light drive signal are synchronous.

9. The drive circuit according to claim 8, wherein the synchronous signal is inputted to the control input end of the second blue light drive circuit, such that the pulse of the second blue light control signal and the pulse of the synchronous signal are synchronous.

10. The drive circuit according to claim 7, wherein the synchronous circuit comprises a coupling element, a resistor and a switch diode, the switch diode is coupled to the fourth end, two ends of the resistor are coupled to the switch diode and the third end, the coupling element is coupled to the first end, the second end, and the two ends of the resistor.

11. The drive circuit according to claim 7, wherein the second blue light drive circuit comprises a control transistor, a source and a drain of the control transistor are coupled to an anode and the cathode of the second blue light diode, and a gate of the control transistor is inputted with the second blue light control signal.

12. The drive circuit according to claim 7, wherein the second blue light control signal is different from the first blue light control signal.

13. A projector, comprising:
a light source, comprising:
  at least one red light diode;
  at least one green light diode;
  at least one first blue light diode; and
  at least one second blue light diode; and
a drive circuit, comprising:
  a red light drive circuit configured to output a red light drive signal to the red light diode according to a red light control signal;
  a green light drive circuit configured to output a green light drive signal to the green light diode according to a green light control signal;
  a first blue light drive circuit configured to output a first blue light drive signal to the first blue light diode according to a first blue light control signal; and
  a second blue light drive circuit configured to output a second blue light drive signal to the second blue light diode according to a second blue light control signal, wherein a pulse of the second blue light control signal and a pulse of the green light drive signal are synchronous;
wherein the second blue light diode is used for increasing brightness, and the second blue light diode does not affect color rendering of the red light diode, the green light diode and the first blue light diode;
the green light drive circuit comprises a synchronous circuit, the synchronous circuit is connected in series with an anode of the green light diode to couple out a synchronous signal, and a pulse of the synchronous signal and the pulse of the green light drive signal are synchronous.

14. The projector according to claim 13, wherein a total quality of the first blue light diode and the second blue light diode is larger than a quality of the red light diode, and the total quality of the first blue light diode and the second blue light diode is larger than a quality of the green light diode.

* * * * *